March 7, 1967    B. R. HAYWORTH ETAL    3,308,359
LOW-INDUCTANCE CAPACITOR
Filed March 12, 1965
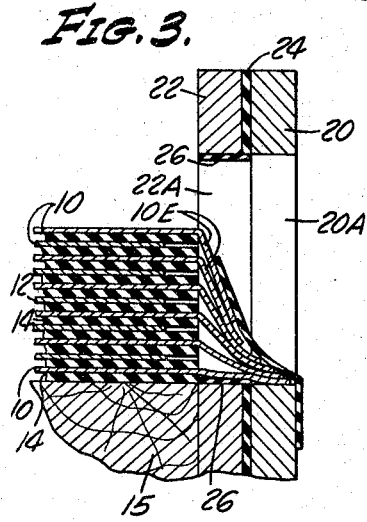
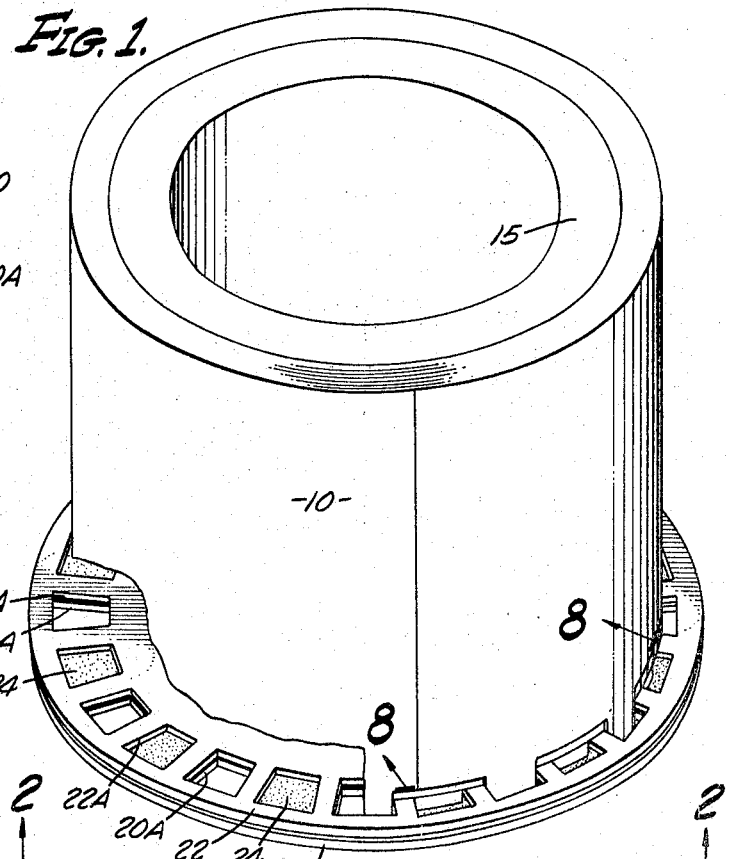
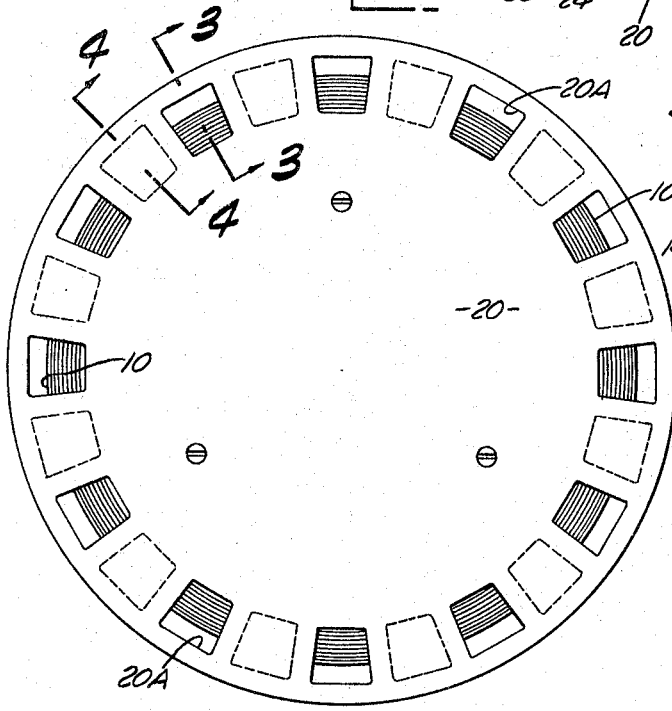
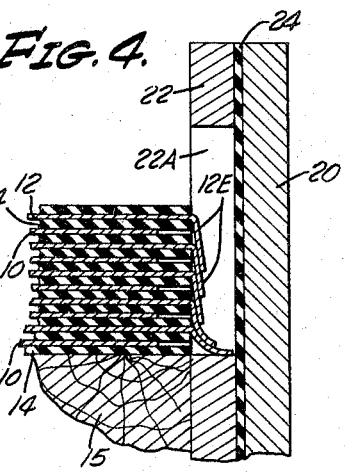
INVENTORS.
BRUCE R. HAYWORTH
TERENCE J. GOODING
BY
Lyon & Lyon
ATTORNEYS March 7, 1967   B. R. HAYWORTH ETAL   3,308,359
LOW-INDUCTANCE CAPACITOR
Filed March 12, 1965   2 Sheets-Sheet 2
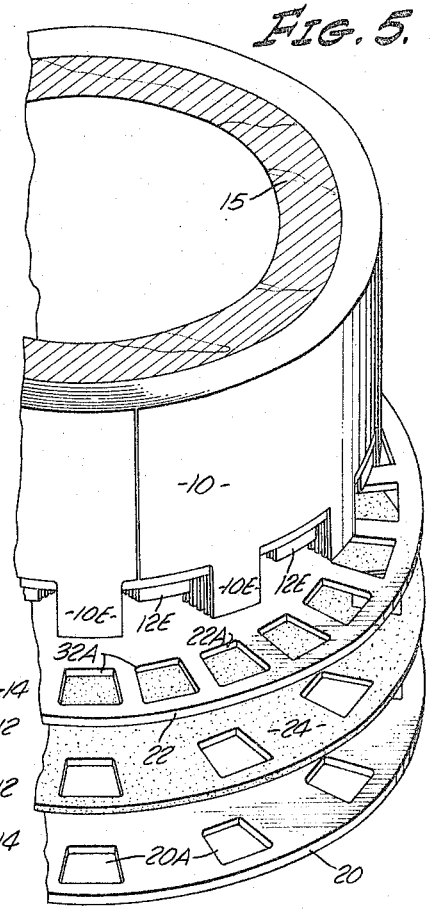
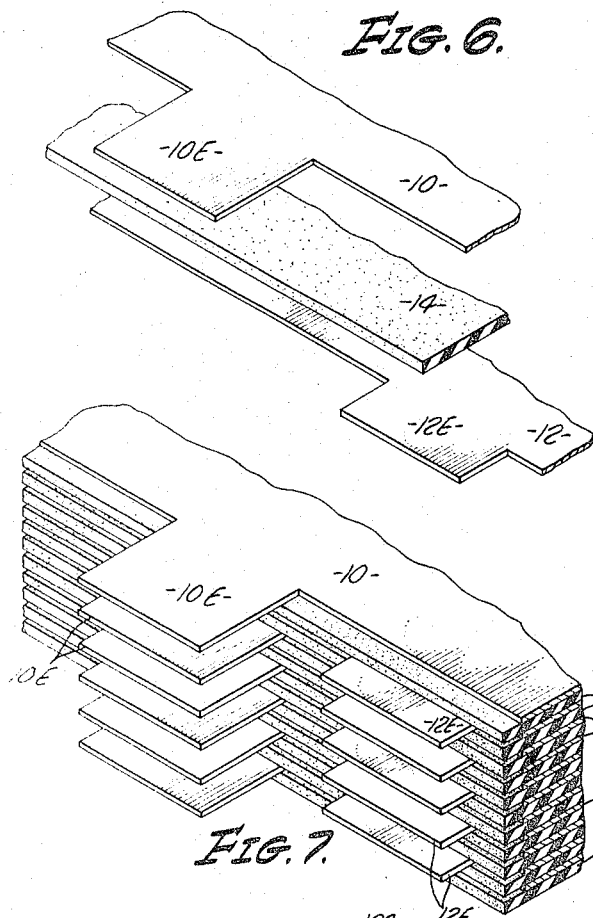
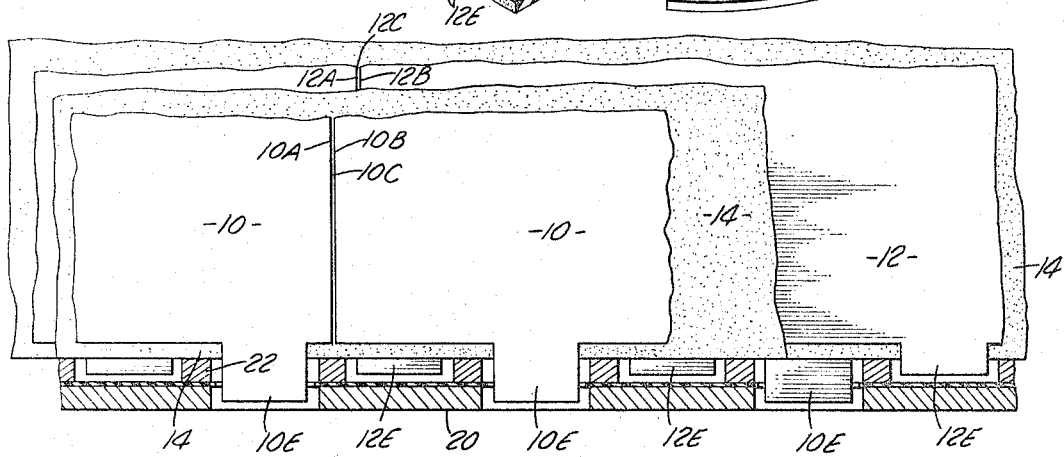
INVENTORS.
BRUCE R. HAYWORTH
TERENCE J. GOODING
BY
Lyon & Lyon
ATTORNEYS

United States Patent Office 3,308,359
Patented Mar. 7, 1967

3,308,359
LOW-INDUCTANCE CAPACITOR
Bruce R. Hayworth, 5401 Via Alcazar, San Diego, Calif. 92111, and Terence J. Gooding, 5583 Del Cerro Blvd., San Diego, Calif. 92120
Filed Mar. 12, 1965, Ser. No. 439,175
6 Claims. (Cl. 317—260)

The present invention relates to capacitor constructions and in particular to capacitors which exhibit an extremely low value of inductance.

Capacitors which have low values of inductance are desirable in many different electrical circuits as, for example, where the reactance resulting from the capacitance of the capacitor is not minimized appreciably by the reactance resulting from the inherent inductance of the capacitor. The deleterious effects of the inherent inductance becomes more pronounced in capacitors of larger sizes within which large electrical energies are required to be stored.

In the conventional design of an energy storage capacitor, multiple layers of metal foil, each spaced by a corresponding layer of multiple layers of insulation are stacked one upon the other with electrodes of opposite polarity being brought out of the stack at opposite ends. Because of such connections at opposite ends, the charge and discharge currents for the capacitor flows to and through a common eletrode exterior to but adjacent to the bulk of the dielectric. The result of this external current is that each layer contains field energy created by other layers as well as its own thereby giving rise to an inherent inductance which is approximately directly proportional to the number of layers, i.e., capacitance.

In the present construction, the electrodes of both polarities, each including a series of tabs on concentric conducting bands, are brought out on the same side of the stack so as to minimize and effectively reduce to zero, external field producing currents in the vicinity of the capacitor. Each layer contains field energy created by only its own currents with the new result that the inherent inductance of the entire stack is approximately inversely proportional to the capacitance of the composite capacitor.

A main object of the present invention is to provide a capacitor construction that exhibits low inductance values.

Another object of the present invention is to provide a capacitor of this character particularly useful for the storage of large amounts of electrical energy.

Another object of the present invention is to provide a capacitor of this character which may be constructed conveniently, easily and simply, particularly in large physical and electrical sizes.

A specific object of the present invention is to provide a capacitor construction in which the current flowing therein produces relatively small magnetic flux interlinkages so that the magnetic flux interlinkages per unit current, i.e., inductance, is relatively small.

Another object of the present invention is to provide a capacitor of this character which may have a large capacitance yet exhibit a relatively small resistance resulting from the fact that individual resistances are effectively connected in parallel.

Another object of the present invention is to provide a capacitor which is of small weight and size in relationship to its capacitance and inductance.

Other objects and advantages of the present invention will be apparent from the following description, reference being made to the accompanying drawings wherein:

FIGURE 1 is a perspective view illustrating constructional features of a capacitor embodying features of the present invention, the capacitor construction.

FIGURE 2 is a view taken substantially as indicated by the line 2—2 in FIGURE 1.

FIGURES 3 and 4 are sectional views taken substantially as indicated by the lines 3—3 and 4—4 in FIGURE 2.

FIGURE 5 is a perspective view like that in FIGURE 1 but with some elements of the capacitor shown in separated relation.

FIGURES 6 and 7 are perspective views illustrating the manner of stacking and also alignment of the tabs of the foil and insulatnig elements.

FIGURE 8 is a view taken in the direction indicated by the lines 8—8 in FIGURE 1 with some of the elements broken away for purposes of illustrating internal constructional features.

The capacitor includes a plurality of layers of metal foil between which are alternately disposed one of a plurality of layers of insulating material. Those layers of metal foil which are ultimately interconnected to provide one "plate" of the capacitor are each designated by the reference numeral 10; and those layers of metal foil which are ultimately interconnected to provide the other "plate" of the capacitor are each designated by the reference numeral 12; and those layers of insulating material which serve as spacers and also the dielectric of the capacitor are each desginated by the reference numeral 14.

Each of the foil layers 10 and 12 is in the form of a single ring or band formed in circular form from a sheet of foil having correspondingly its ends 10A, 10B and 12A, 12B in close relationship at either a butt joint or as illustrated with a corresponding slight gap 10C, 12C between adjacent ends.

The foil layers are individually and progressively wound about a center hollow core member 15 of insulating material illustrated in FIGURE 4 as being of wood but, of course, other insulating material may be used.

Each of the foil strips or layers 10, 12 has a series of twelve integrally formed and spaced tabs 10E, 12E extending from one edge thereof. When such strips or layers 10, 12 are assembled, as illustrated, tabs 10E of each layer 10 are aligned and also the tabs 12E of each layer 12 are aligned but in staggered relation to the aligned tabs 10E.

Thus, considering a plurality of foil layers 10 and 12, there are twelve stacks of tabs 10E and twelve stacks of tabs 12E staggered relative to the stacks of tabs 10E. It it noted that the tabs 12E are each shorter than the tabs 10E for purposes of their assembly and electrical connection with respect to two discs 20, 22 which are insulated from each other by an insulator disc 24 sandwiched between discs 20, 22.

The disc 22 is formed with twenty-four circumferentially spaced slotted portions 22A and the disc 20 is formed with twelve slotted portions 20A (the insulating disc 24 being correspondingly apertured) each of which is aligned with an alternate one of the twenty-four slotted portions 22A for receiving the stacks of tabs 10E as indicated in FIGURE 3. The shorter tabs 12E extend only into alternate ones of the apertured portions 22A as indicated in FIGURE 4.

A stack of tabs 10E is electrically connected as, for example, by soldering to and within a corresponding one of the disc apertured portions 20A, the apertured portion 22A in FIGURE 3 being lined with an insulating liner 26; and likewise, a corresponding stack of tabs 12E is electrically connected within a corresponding one of the disc apertured portions 22A.

In fabrication, initially the apertured discs 20, 22 with insulating disc 24 therebetween may be secured to the center winding form or support 15. The first insulating strip 14 may be wound around the support 15 as indicated in FIGURE 3. Then the first foil strip 10 may be wound taking precautions in such winding to insert the tabs 10E through the aligned disc apertured portions 22A, 20A. The second insulating strip 14 is wound followed by winding of the first foil strip 12 (FIGURE 4) taking precautions in such winding to insert the foil tabs 12E into disc apertured portion 22A.

This winding process may be continued in the order indicated with the foil and insulating strips being of progressively larger length so that their ends meet at substantially a butt joint.

After the desired number of foils are wound, the individual stacks of tabs are each connected as a unit to the corresponding ring 20, 22 which thus serve as terminals for the composite capacitor.

It will be appreciated that an insulating protective coating such as, for example, a conventional potting compound may be used to seal and protect the composite capacitor from moisture and handling.

It will be appreciated from the foregoing description that other procedures may be used in effecting the assembly. For example, and as preferred, the foil and insulating strips 10, 12 and 14 are first wound about a form and the tabs 12E are secured to the back disc or flange 22; then the apertured insulating disc 24 is applied and the outer flange or disc 20 may be then applied to which the tabs 10E are then connected.

As by way of example and not by limitation, aluminum foil having a thickness of .0005 inch may be used; the dielectric material between foil sheets may be Mylar having a thickness of .004 inch in a twenty microfarad capacitor having a length of approximately 10 inches, with the self-inductance being very small, i.e., appreciably less than one nanohenry ($10^{-9}$ henrys).

In either case, the tabs of opposite polarity alternate in space with an appropriate gap between foil portions to withstand the applied voltage which is suitably applied between the flanges or discs 20, 22.

It is desirable that the number of tabs 10E, 12E be as numerous as possible consistent with practical fabrication considerations so as to approach the ideal condition wherein there is uniform density in the current which flows essentially in concentric sheets.

The application of voltage between flanges 20, 22 thus results in essentially a concentric flow of current in opposite directions within the foils defining opposite "plates" of the individual capacitors which are all effectively connected in parallel in a capacity adding sense without, however, the addition of added inductance. By thus providing the flanges 20, 22 with equally spacer apertured portions therein, as shown in the drawings, within which, respectively, the longer and shorter tabs 10E, 12E are connected, a concentric flow of current is assured using a novel construction which is simple, rugged and compact.

While, as shown, the capacitor in cross-section is generally circular, other closed geometrical configurations may be used such as, for example, closed squares, triangles, hexagons, with the ends of the foils either overlapping, abutting or being in close proximity to each other, all as illustrated at 10A, 10B, 12A, 12B in FIG. 8, and thus the term loop or loops, as used herein, has reference not only to the form specifically illustrated in the drawings, but also to these other forms of generally cylindrical but not necessarily circular constructions.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. A capacitor construction including a first series of a plurality of loops of concentrically disposed and circumferentially extending conductors; a second series of a plurality of loops of concentrically disposed and circumferentially extending conductors interleaved between said first series and defining therewith a plurality of generally tubular and concentric capacitors; each of said first series of concentrically disposed conductors having a plurality of axially extending conducting portions connected thereto at spaced points along its circumference and at one end of said tubular capacitors; each of said second series of concentrically disposed conductors having a plurality of axially extending conducting portions connected thereto at spaced points along its circumference and at said one end of said tubular capacitors; a first generally annular conducting element connected at spaced points therealong to said conducting portions of said first series of conductors; and a second generally annular conducting element connected at spaced points therealong to said conducting portions of said second series of conductors; said first and second elements being the common terminals for each of said plurality of capacitors.

2. A construction as set forth in claim 1 in which said conductors are thin metal foils; insulating means between said foils; and said conducting portions are integrally formed tabs of said foils.

3. A construction as set forth in claim 2 in which said first element is an annular element having a plurality of spaced apertured portions within which said conducting portions of said first series are connected; said second element is an annular element having a plurality of spaced apertured portions; said conducting portions of said second series extending through the apertured portions of said first element and into said apertured portions of said second element where the same are connected.

4. A capacitor construction including a first annular element defining on terminal of a capacitor; a second annular element adjacent to and coaxial with said first element and defining the other terminal of said capacitor; a first and a second plurality of interleaved concentric conducting elements; said conducting elements each having conducting portions extending axially from the same adjacent ends thereof and connected to spaced points along said first and second annular elements.

5. A capacitor construction including a first series of a plurality of concentric conductors; a second series of a plurality of concentric conductors interleaved in said first series; each conductor of said first and second series having spaced integrally formed tabs extending therefrom in the same direction; first annular means comprising a first terminal having said tabs of said first series of conductors connected thereto; second annular means adjacent to and coaxial with said first means and comprising a second terminal having said tabs of said second series of conductors connected thereto.

6. A capacitor construction including a plurality of concentrically disposed elements defining generally opposite plates of a capacitor; each of said elements having conducting portions thereon extending in the same direction therefrom; a first annular element connected at spaced points therealong to conducting portions of one of said plates; a second annular element connected at spaced points therealong to conducting portions of the other of said opposite plates.

References Cited by the Examiner

UNITED STATES PATENTS

| 2,119,113 | 5/1938 | Olving | 317—260 |
| 2,497,066 | 2/1950 | Brennan | 317—258 X |
| 3,206,661 | 9/1965 | Blank | 317—260 |

FOREIGN PATENTS

| 1,280,454 | 11/1961 | France. |
| 961,986 | 6/1964 | Great Britain. |

LEWIS H. MYERS, *Primary Examiner.*

E. GOLDBERG, *Assistant Examiner.*